(12) United States Patent
Noma et al.

(10) Patent No.: US 10,115,369 B2
(45) Date of Patent: Oct. 30, 2018

(54) ACTIVE MATRIX SUBSTRATE, AND DISPLAY DEVICE INCLUDING THE ACTIVE MATRIX SUBSTRATE

(71) Applicant: Sharp Kabushiki Kaisha, Sakai, Osaka (JP)

(72) Inventors: Takeshi Noma, Sakai (JP); Kohhei Tanaka, Sakai (JP); Takayuki Nishiyama, Sakai (JP); Ryo Yonebayashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/307,040

(22) PCT Filed: Apr. 22, 2015

(86) PCT No.: PCT/JP2015/062235
§ 371 (c)(1),
(2) Date: Oct. 27, 2016

(87) PCT Pub. No.: WO2015/166857
PCT Pub. Date: Nov. 5, 2015

(65) Prior Publication Data
US 2017/0047038 A1    Feb. 16, 2017

(30) Foreign Application Priority Data

Apr. 28, 2014  (JP) ................................. 2014-092767

(51) Int. Cl.
*G09G 3/36* (2006.01)
*G02F 1/1362* (2006.01)
(Continued)

(52) U.S. Cl.
CPC ......... *G09G 3/3696* (2013.01); *G02F 1/1368* (2013.01); *G02F 1/133514* (2013.01);
(Continued)

(58) Field of Classification Search
CPC .......... G09G 3/20; G09G 3/36; G09G 3/3611; G09G 3/3648; G09G 3/3674–3/3696;
(Continued)

(56) References Cited

U.S. PATENT DOCUMENTS

2003/0030606 A1    2/2003  Hector et al.
2009/0046085 A1*   2/2009  Ino ....................... G09G 3/3648
                                                      345/208
(Continued)

FOREIGN PATENT DOCUMENTS

JP         11-184406 A      7/1999
JP         2004-538511 A   12/2004

*Primary Examiner* — Nathan Danielsen
(74) *Attorney, Agent, or Firm* — Keating & Bennett, LLP

(57) ABSTRACT

To reduce the parasitic capacitance of a driving circuit and definitely switches a gate line to a selection state, an active matrix substrate is provided. The active matrix substrate includes a driving circuit that switches a gate line (13G) to a selection state in a pixel region defined by a source line (15S) and the gate line (13G). The driving circuit includes: a plurality of switching elements including an output switching element (TFT-F) that supplies a selection voltage to the gate line; and an internal line (netA) to which a gate terminal of the output switching element (TFT-F) and at least a first switching element of the switching elements other than the output switching element are connected. The active matrix substrate includes a reduction part (C1 and C2) that reduce the parasitic capacitance of the driving circuit in the pixel region in which at least one of the internal line and the first switching element is located.

7 Claims, 16 Drawing Sheets

(51) Int. Cl.
| | |
|---|---|
| *G02F 1/1368* | (2006.01) |
| *G09F 9/30* | (2006.01) |
| *G09F 9/35* | (2006.01) |
| *G09G 3/20* | (2006.01) |
| *G02F 1/1335* | (2006.01) |
| *G02F 1/1333* | (2006.01) |
| *G02F 1/1343* | (2006.01) |

(52) U.S. Cl.
CPC .......... *G02F 1/136286* (2013.01); *G09F 9/30* (2013.01); *G09F 9/35* (2013.01); *G09G 3/20* (2013.01); *G09G 3/36* (2013.01); *G09G 3/3677* (2013.01); *G09G 3/3688* (2013.01); *G02F 1/133345* (2013.01); *G02F 1/133512* (2013.01); *G02F 1/134336* (2013.01); *G02F 2201/123* (2013.01); *G09G 2300/0408* (2013.01); *G09G 2300/0426* (2013.01); *G09G 2310/08* (2013.01)

(58) Field of Classification Search
CPC ... G09G 2300/0404; G09G 2300/0408; G09G 2300/0426; G09G 2310/0202; G09G 2310/0213; G09G 2310/0216; G09G 2310/0281; G09G 2310/0289; G09G 2310/0291; G09G 2310/08; G02F 1/133345; G02F 1/133512; G02F 1/133514; G02F 1/134336; G02F 1/136286; G02F 1/1368; G02F 2201/123; G02F 2201/13629; G02F 2201/136295; G09F 9/30; G09F 9/35

See application file for complete search history.

(56) References Cited

U.S. PATENT DOCUMENTS

| | | | |
|---|---|---|---|
| 2014/0028534 A1* | 1/2014 | Park | G09G 3/3677 345/84 |
| 2014/0267968 A1* | 9/2014 | Haga | G09G 3/3648 349/43 |

* cited by examiner

ACTIVE MATRIX SUBSTRATE, AND DISPLAY DEVICE INCLUDING THE ACTIVE MATRIX SUBSTRATE

TECHNICAL FIELD

The present invention relates to an active matrix substrate, and a display device including the active matrix substrate.

BACKGROUND ART

JP 2004-538511-A discloses an active matrix display device that includes conductor lines each extending from an end of each column address conductor and terminating at each row address conductor, and complementary conductor lines each extending from the position where the conductor line terminates through an picture element to the other end of the column address conductor in the direction in which the column address conductors extend. The complementary conductor lines are connected via a common conductor line to a reference signal source such that selection signals are provided from ends of the conductor lines to the row address conductors, respectively.

DISCLOSURE OF THE INVENTION

According to JP 2004-538511-A, the complementary conductor lines are routed from the row address conductors through the picture elements to the other ends of the column address conductors. This makes it possible to reduce the size of the frame region in comparison with the case in which selection signals are provided from ends of the row address conductors as measured in the direction of extension of the row address conductors to the row address conductors. However, the routing of the row address conductors increases the parasitic capacitance of the row address conductors.

Additionally, the active matrix substrate is provided with driving circuits including a plurality of switching elements for each gate line. The driving circuit includes an output switching element that provides a selection voltage to the gate line, and the gate terminal of the output switching element is connected with an internal line of the driving circuit. The increase in potential of the internal line when the gate line is switched to a selection state provides a selection voltage via the output switching element to the gate line, which charges the gate line. Thus, when the internal line and switching element of the driving circuit have parasitic capacitance, the potential of the internal line does not increase, and thus the gate line cannot be switched to a selection state.

An objective of the present invention is to provide a technique to reduce the parasitic capacitance of the driving circuit and definitely switch the gate line to a selection state.

The active matrix substrate according to the present invention includes a plurality of source lines and a plurality of gate lines crossing the source lines. The active matrix substrate includes pixel electrodes individually in a plurality of pixel regions defined by the source lines and the gate lines. The active matrix substrate includes: a driving unit provided in some of the pixel regions and including a driving circuit for each gate line to switch the gate line to a selection state in accordance with a control signal provided; and reduction parts that reduce the parasitic capacitance of the driving circuits in the pixel regions in which the driving unit is provided. The driving circuit includes: a plurality of switching elements; and an internal line connected with a gate terminal of an output switching element among the switching elements that supplies a selection voltage for switching one gate line to a selection state, at least a first switching element of the switching elements other than the output switching element, and the one gate line. The reduction part is provided in the pixel region in which at least one of the internal line and first switching element of the driving circuit is located.

The arrangements of the present invention reduce the parasitic capacitance of a driving circuit and thus can definitely switch a gate line to a selection state.

EMBODIMENTS FOR CARRYING OUT THE INVENTION

Figure 1:
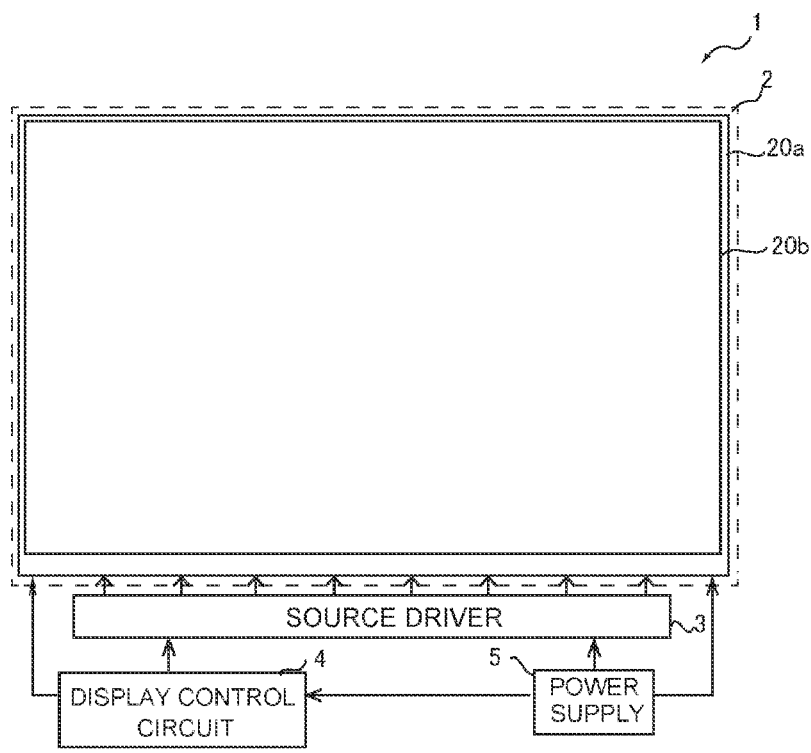
FIG. 1 is a schematic view of a liquid crystal display device according to a first embodiment.

An active matrix substrate according to an embodiment of the present invention includes a plurality of source lines and a plurality of gate lines crossing the source lines. The active matrix substrate includes pixel electrodes in a plurality of pixel regions defined by the source lines and the gate lines. The active matrix substrate includes: a driving unit provided in some of the pixel regions and each including a driving circuit for each gate line to switch the gate line to a selection state in accordance with a control signal provided; and reduction parts that reduce the parasitic capacitance of the driving circuits in the pixel regions in which the driving unit is provided. The driving circuit includes: a plurality of switching elements; and an internal line connected with a gate terminal of an output switching element among the switching elements that supplies a selection voltage for switching one gate line to a selection state, at least a first switching element of the switching elements other than the output switching element, and the one gate line. The reduction part is provided in the pixel region in which at least one of the internal line and first switching element of the driving circuit is located (first arrangement).

The first arrangement includes a driving unit in some of the pixel regions in the active matrix substrate. The driving unit includes a driving circuit for each gate line to switch the gate line to a selection state in accordance with a control signal provided. The driving circuit includes a plurality of switching elements and an internal line. The internal line is connected with: a gate terminal of an output switching element that supplies a selection voltage to the gate line; at least a first switching element of the switching elements other than the output switching element; and one gate line. In the case in which the parasitic capacitance of the internal line is increased, the potential of the internal line is not increased when the gate line is switched to a selection state, and thus a selection voltage cannot be provided via the output switching element to the gate line. The first arrangement is provided with a reduction part in the pixel region in which at least one of the internal line and the first switching element is located. This provision reduces the parasitic capacitance of at least one of the internal line and the first switching element. Thus, the potential of the internal line can be increased when the gate line is switched to a selection state in comparison with the case in which the reduction part is not provided, and the gate line can more definitely be switched to a selection state.

Starting from the first arrangement, a second arrangement may be provided with the driving circuit between the pixel electrode and a layer in which the gate line is provided in the active matrix substrate. The second arrangement includes a conductive layer between the pixel electrodes and the driving circuits in the pixel regions in which the driving unit is provided. The reduction part can be provided at a position at which at least one of the internal line and first switching element of the driving circuit overlies the conductive layer.

The second arrangement is provided with the conductive layer between the pixel electrodes and the driving circuits in some of the pixel regions. This provision can prevent the interference between the pixel electrode and the driving circuit. This arrangement is provided with the reduction part at a position at which at least one of the internal line and first switching element of the driving circuit overlies the conductive layer. This provision can reduce the parasitic capacitance between the conductive layer and at least one of the internal line and first switching element of the driving circuit.

Starting from the second arrangement, the internal line of the second arrangement may be formed in the same layer as the one gate line in a third arrangement. The reduction part may include an electrode connected via a contact with the one gate line between the conductive layer and the internal line in the pixel region in which the internal line of the driving circuit is located.

The third arrangement is provided with an electrode between the conductive layer and the internal line in the pixel region in which the internal line is located. The electrode is connected via the contact with the one gate line. The electrode reduces the parasitic capacitance between the internal line and the conductive layer, and thus can increase the potential of the internal line. The electrode and the internal line form a capacitance, and thus can amplify the potential of the internal line.

In a fourth arrangement, the reduction part of the second or third arrangement may include an aperture at a position overlying the internal line of the driving circuit in the conductive layer in the pixel region in which the internal line is located.

The fourth arrangement is provided with an aperture at a position overlying the internal line in the conductive layer. This provision reduces the parasitic capacitance between the internal line and the conductive layer, and thus can increase the potential of the internal line.

Starting from the second or third arrangement, in a fifth arrangement, the reduction part may include an aperture at a position overlying the first switching element in the conductive layer in the pixel region in which the first switching element of the driving circuit is located.

The fifth arrangement is provided with an aperture at a position overlying the first switching element of which drain terminal is connected with the internal line in the conductive layer. This provision reduces the parasitic capacitance between the first switching element and the conductive layer, and thus can increase the potential of the internal line.

A sixth arrangement may be provided with a drain terminal and a source terminal that are different from each other in area in the first switching element of any one of the first to fifth arrangements. The reduction part may include a connection part that connects the drain terminal or the source terminal, whichever has a smaller area, with the internal line.

In the sixth arrangement, the connection part connects the drain terminal or the source terminal of the first switching element, whichever has a smaller area, with the internal line. This connection can reduce the parasitic capacitance between the first switching element and the internal line in comparison with the switching element provided with a drain terminal and a source terminal that have the same area.

A display device according to an embodiment of the present invention includes: any one of the active matrix substrates of the first to sixth arrangements; a counter substrate with color filters; and a liquid crystal layer held between the active matrix substrate and the counter substrate (seventh arrangement).

Embodiments of the present invention will be described below in detail with reference to the drawings. The same or corresponding components in the drawings are labeled with the same reference numerals and their description will not be repeated.

First Embodiment (Configuration of Liquid Crystal Display Device)

FIG. 1 is a schematic view of a liquid crystal display device according to the present embodiment. A liquid crystal display device 1 includes a display panel 2, a source driver 3, a display control circuit 4, and a power supply 5. The display panel 2 includes an active matrix substrate 20a, a counter substrate 20b, and a liquid crystal layer (not illustrated) held between the active matrix substrate 20a and the counter substrate 20b. Although not illustrated in FIG. 1, a pair of polarizers is provided to hold the active matrix substrate 20a and the counter substrate 20b between the polarizers. On the counter-substrate 20b are provided: a black matrix, red (R), green (G) and blue (B) color filters, and a common electrode (all not illustrated).

As illustrated in FIG. 1, the active matrix substrate 20a is electrically connected with the source driver 3 provided on a flexible substrate. The display control circuit 4 is electrically connected with the display panel 2, the source driver 3, and the power supply 5. The display control circuit 4 provides control signals to the source driver 3 and driving circuits, as described below, provided on the active matrix substrate 20a (hereinafter referred to as gate drivers). The power supply 5 is electrically connected with the display panel 2, the source driver 3, and the display control circuit 4 in order to supply power supply voltage signals thereto.

(Configuration of Active Matrix Substrate)

Figure 2:
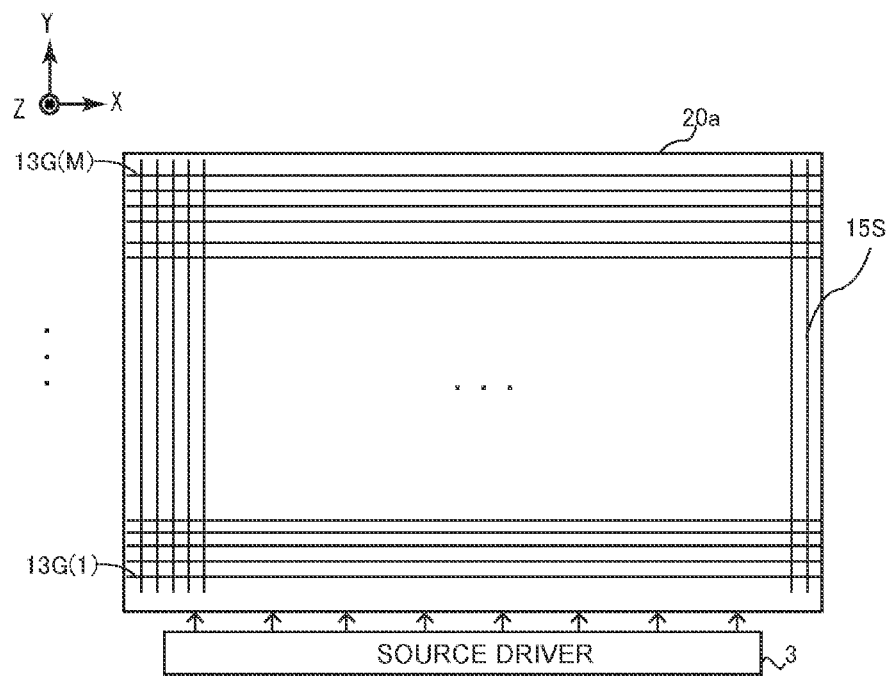
FIG. 2 is a schematic view of an active matrix substrate illustrated in FIG. 1.

FIG. 2 is a schematic view illustrating a brief configuration of the active matrix substrate 20a. On the active matrix substrate 20a are provided M (M is a natural number) gate lines 13G(1) to 13G(M) extending from one end to the other end of the substrate disposed in the X-direction. The gate lines 13G(1) to 13G(M) are positioned at a constant distance and substantially parallel to each other. Hereinafter, the gate lines will be simply referred to as gate lines 13G when they are not differentiated. The active matrix substrate 20a is provided with a plurality of source lines 15S crossing the gate lines 13G. A region defined by the gate line 13G and the source line 15S forms a pixel. Each pixel corresponds to one of the colors of the color filters.

Figure 3:
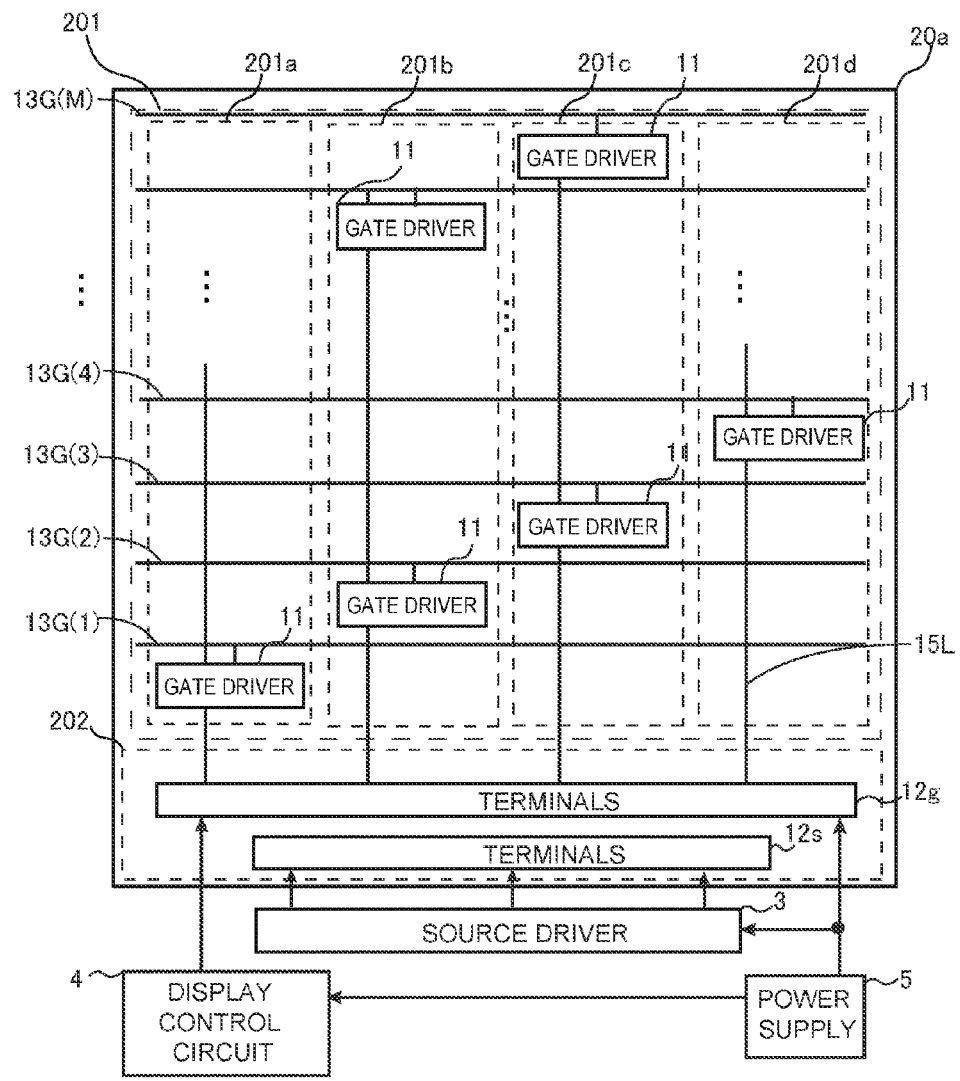
FIG. 3 is a schematic view of the active matrix substrate illustrated in FIG. 1 and components connected with the active matrix substrate.

FIG. 3 is a schematic view of the active matrix substrate 20a and the components connected with the active matrix substrate 20a. For convenience, the source lines 15S are not illustrated in FIG. 3. As illustrated in the example of FIG. 3, each of the gate drivers 11 is located between the gate line 13G and the gate line 13G in the display region 201. In this example, one gate driver 11 is provided for each gate line 13G. Each gate driver 11 is provided in one of a region 201a, a region 201b, a region 201c, and a region 201d of a display region 201. In the region 201a, the region 201b, the region 201c, and the region 201d, one gate driver 11 is provided for every four gate lines 13G. The gate drivers 11 located in the same region are connected with each other via a lines 15L.

In the active matrix substrate 20a illustrated in FIG. 3, terminals 12g are provided, in a frame region 202, along the edge of the active matrix substrate where the source driver 3 adjoins. The terminals 12g are connected with the display control circuit 4 and the power supply 5. The terminals 12g receive signals including a control signal and a power supply voltage signal provided from the display control circuit 4 and the power supply 5. The signal, such as the control signal or the power supply voltage signal input to the terminal 12g, is provided via the line 15L to each gate driver 11. The gate driver 11 provides a voltage signal indicating one of a selection state and a non-selection state to the connected gate line 13G in response to the signal provided. In the following description, when a gate line 13G is in a selection state, that may be described as "a gate line 13G is driven".

The frame region 202 of the active matrix substrate 20a is further provided with terminals 12s that connect the source driver 3 to the source lines 15S (see FIG. 2). In response to a control signal provided by the display control circuit 4, the source driver 3 provides a data signal to each source line 15S (see FIG. 2).

The display control circuit 4 supplies, as control signals, a signal that switches between H level and L level alternately at each horizontal scan interval (hereinafter referred to as a clock signal), and a signal with a potential identical to H level of the clock signal (hereinafter referred to as a reset signal) to the terminals 12g.

Figure 4:
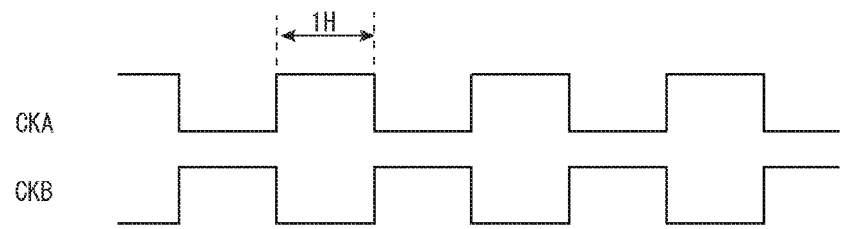
FIG. 4 illustrates exemplary waveforms of the clock signals according to the first embodiment.

FIG. 4 illustrates exemplary waveforms of the clock signals. In the present embodiment, two-phase clock signals (CKA) and (CKB) whose phases are opposite to each other are supplied as the clock signals to the terminals 12g. Although the two-phase clock signals are used in this example, a plurality of different-phase clock signals may be used. For example, four-phase clock signals that switches between H level and L level alternately at every two horizontal scan intervals and have phases deviated from each other by one-fourth of a period, or eight-phase clock signals that switches between H level and L level alternately at every four horizontal scan intervals and have phases deviated from each other by one-eighth of a period, may be used.

Figure 5:
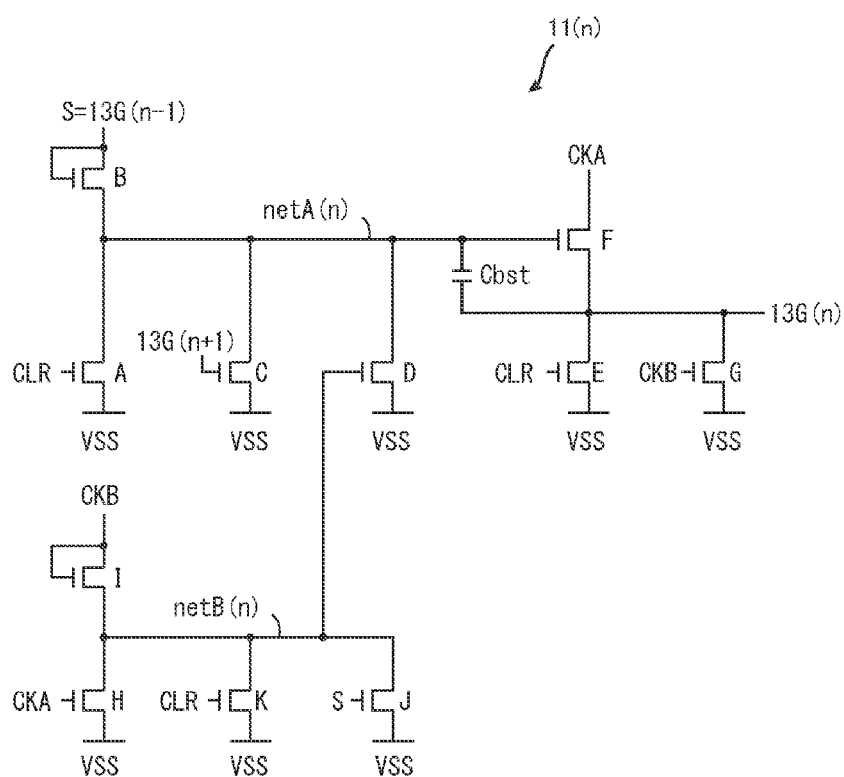
FIG. 5 illustrates an exemplary equivalent circuit of a gate driver illustrated in FIG. 3.

Next, the configuration of the gate driver 11 of the present embodiment will be described. FIG. 5 illustrates an exemplary equivalent circuit of the gate driver 11 that drives the gate line 13G(n) (hereinafter referred to as a gate driver 11(n)).

As illustrated in FIG. 5, the gate driver 11(n) includes thin film transistors (TFT) labeled with alphabets A to K (hereinafter referred to as TFT-A to TFT-K) as switching elements, and a capacitor Cbst.

In FIG. 5, the internal line to which the source terminal of the TFT-B, the drain terminals of the TFT-A, TFT-C, and TFT-D, the gate terminal of the TFT-F, and a first electrode of the capacitor Cbst are connected will be referred to as netA. The internal line to which the source terminal of the TFT-I, the drain terminals of the TFT-H, TFT-J, and TFT-K, and the gate terminal of the TFT-D are connected will be referred to as netB.

The TFT-A includes a drain terminal connected with the netA, a gate terminal to which a reset signal CLR is supplied, and a source terminal to which a power supply voltage signal VSS is supplied.

The gate terminal and drain terminal of the TFT-B are connected with each other, and the gate terminal and the drain terminal of the TFT-B are connected with a gate line 13G(n−1). The source terminal of the TFT-B is connected with the netA. The TFT-B receives the potential of the gate line 13G(n−1) as a set signal S. The TFT-B of the gate driver 11 that drives a gate line 13G(1) receives a gate start pulse signal, as a set signal S, provided by the display control circuit 4.

The capacitor Cbst includes a first electrode connected with the netA(n) and a second electrode connected with the gate line 13G(n).

The TFT-C includes a gate terminal connected with a gate line 13G(n+1), a drain terminal connected with the netA(n), and a source terminal to which a power supply voltage signal VSS is supplied.

The TFT-D includes a gate terminal connected with the netB(n), a drain terminal connected with the netA(n), and a source terminal to which a power supply voltage signal VSS is supplied.

The TFT-E includes a drain terminal connected with the gate line 13G(n), a gate terminal to which a reset signal CLR is supplied, and a source terminal to which a power supply voltage signal VSS is supplied.

The TFT-F includes a gate terminal connected with the netA(n), a source terminal connected with the gate line 13G(n), and a drain terminal to which a clock signal CKA is supplied. The TFT-F functions as an output buffer that provides a selection voltage, to the gate line 13G(n), for switching the gate line 13G(n) to a selection state. Since the output buffer has a load heavier than the other TFTs, the output buffer needs to have a channel width wider than the other TFTs. In the equivalent circuit illustrated in FIG. 5, the TFT-F is described as one TFT. In the present embodiment, however, the TFT-F includes a plurality of TFTs. A specific example of the TFT-F will be described below.

The TFT-G includes a drain terminal connected with the gate line 13G(n), a gate terminal to which a clock signal CKB is supplied, and a source terminal to which a power supply voltage signal VSS is supplied.

The TFT-H includes a drain terminal connected with the netB(n), a gate terminal to which a clock signal CKA is supplied, and a source terminal to which a power supply voltage signal VSS is supplied.

The TFT-I includes a gate terminal and a drain terminal connected with each other, and the gate terminal and the drain terminal are supplied with a clock signal CKB. The TFT-I includes a source terminal connected with the netB (n).

The TFT-J includes a gate terminal connected with the gate line 13G(n−1), a drain terminal connected with the netB(n), and a source terminal to which a power supply voltage signal VSS is supplied. The TFT-J receives the potential of the gate line 13G(n−1) as a set signal S. The TFT-J of the gate driver 11 that drives the gate line 13G(1) receives a gate start pulse signal, as a set signal S, provided by the display control circuit 4.

The TFT-K includes a drain terminal connected with the netB(n), a gate terminal to which a reset signal CLR is supplied, and a source terminal to which a power supply voltage signal VSS is supplied.

Figure 6:
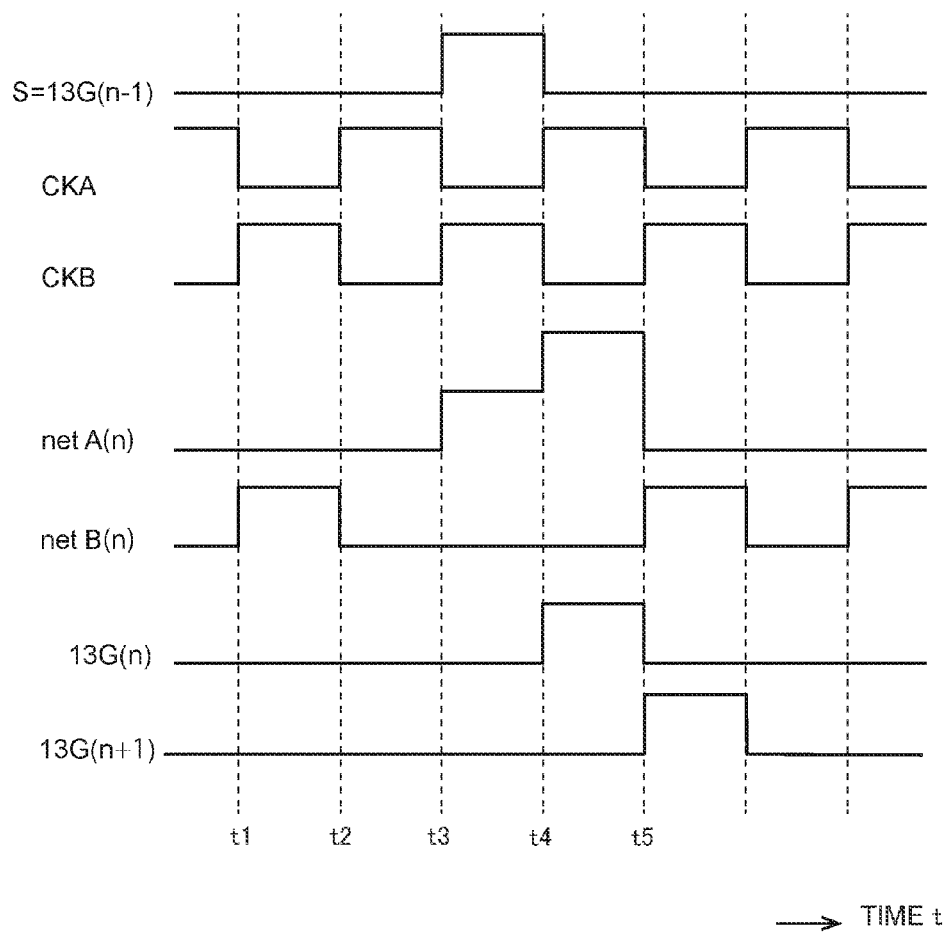
FIG. 6 is a timing chart showing signals encountered when the gate driver illustrated in FIG. 5 drives the gate lines.

Next, the operation of the gate driver 11 will be described. FIG. 6 is a timing chart showing signals used when the gate driver 11(n) drives the gate line 13G(n).

To the gate driver 11(n) are supplied the clock signals CKA, and CKB provided by the display control circuit 4. Although not illustrated in FIG. 6, a reset signal CLR that are set to H (high) level at each vertical scan interval for a predetermined period of time is supplied from the display control circuit 4 to each gate driver 11. When the reset signal CLR is supplied, the potential of the netA(n), netB(n), and the gate line 13G in the gate driver 11(n) transition to L (Low) level.

From time t1 to t2, an L-level potential of the clock signal CKA and an H-level potential of the clock signal CKB are supplied to the gate driver 11(n). Thus, the TFT-I is turned on and the TFT-H is turned off such that the netB is charged to the H-level potential. Further, the TFT-D is turned on such that the netA is charged to the power supply voltage VSS (L level). Furthermore, the TFT-G is turned on and the TFT-F is turned off such that the gate line 13G(n) is charged to the L-level potential.

Next, at time t2, an H-level potential of the clock signal CKA and an L-level potential of the clock signal CKB are supplied to the gate driver 11(n). Thus, the TFT-I is turned off and the TFT-H is turned on such that the netB(n) is charged to the L-level potential. Further, the TFT-D is turned off, which maintains the netA(n) at the potential of the power supply voltage VSS (L level). Meanwhile, the TFT-G is turned off and the TFT-F is turned off, which maintains the gate line 13G(n) at the L-level potential.

At time t3, the gate line 13G(n−1) is driven, which supplies the L-level potential of the clock signal CKA and the H-level potential of the clock signal CKB to the gate driver 11(n). While the TFT-I is turned on and the TFT-H is turned off, the H-level potential of the gate line 13G(n−1) is supplied as a set signal to the gate terminal of the TFT-J and then the TFT-J is turned on. On the condition that the TFT-J is configured to have a charging capacity higher than the TFT-I, the netB(n) is maintained at the L-level potential.

Furthermore, the gate terminal and drain terminal of the TFT-B are supplied with the H-level potential of the gate line 13G(n−1) as a set signal such that the TFT-B is turned on. The TFT-D is turned off such that the netA(n) is precharged to the potential difference between the H-level potential and the threshold voltage of the TFT-B, and then the TFT-F is turned on. Meanwhile, the TFT-G is turned on, which maintains the gate line 13G(n) at the L-level potential.

Subsequently, at time t4, the gate line 13G(n−1) is switched to a non-selection state, and the H-level potential of the clock signal CKA and the L-level potential of the clock signal CKB is supplied to the gate driver 11(n).

The TFT-I is turned off and the TFT-H is turned on such that the gate terminal of the TFT-J is supplied with the L-level potential of the gate line 13G(n−1) as a set signal S and then the TFT-J is turned off. Thus, the netB(n) is maintained at the L-level potential.

Furthermore, the gate terminal and drain terminal of the TFT-B is supplied with the L-level potential of the gate line 13G(n−1) as a set signal S and then the TFT-B is turned off. Furthermore, the TFT-A, TFT-C, and TFT-D are also turned off such that the netA(n) is in a floating state. Meanwhile, the drain terminal of the TFT-F is supplied with the H-level potential of the clock signal CKA. Thus, the gate line 13G(n) is supplied with the H-level potential, and the capacitor Cbst upthrusts the potential of the netA(n) such that the potential rises to a potential higher than the H-level potential. The TFT-G is turned off, which switches the gate line 13G(n) to a selection state.

The potential of the netA(n) depends on the capacitance of the capacitor Cbst, the parasitic capacitance of the netA (n), and the capacitance of the FTF connected with the netA(n). In other words, an efficiency T in increase in potential of the netA(n) will be expressed by the following equation (1).

$$T=(C+C1)/(C+C2+C3) \qquad (1)$$

C: the capacitance of the capacitor Cbst
C1: the parasitic capacitance of the TFT-F
C2: the parasitic capacitance of the netA
C3: the parasitic capacitance of the TFTs connected with the netA As shown in the equation (1), the larger the parasitic capacitance of the netA and the parasitic capacitance of the TFT connected with the netA are, the lower the efficiency in increase in potential of the netA is. Thus, the potential of the netA is reduced. In light of the foregoing, the active matrix substrate 20a of the present embodiment is provided with a reduction part that reduces at least one of the parasitic capacitance of the netA and the parasitic capacitance of the TFT connected with the netA. The reduction part of the present embodiment will be described later.

At time t5, the gate line 13G(n+1) is driven, which supplies the L-level potential of the clock signal CKA and the H-level potential of the clock signal CKB to the gate driver 11(n). The TFT-I is turned on and the TFT-H and TFT-J are turned off such that the netB(n) is charged to the H-level potential.

Meanwhile, the H-level potential of the gate line 13G(n+1) is supplied to the gate terminal of the TFT-C such that the TFT-C is turned on. Furthermore, the TFT-D is turned on and the TFT-B is turned off such that the netA(n) is charged to the L-level potential. Then, the TFT-F is turned off and the TFT-G is turned on such that the gate line 13G(n) is charged to the L-level potential and then is switched to the non-selection state.

At and after time t5, in response to the potential of the clock signals CKA and CKB, the potential of the netB(n) repeatedly switches between H level and L level. At and after time t5, the netA(n) is maintained at the L-level potential and the gate line 13G(n) is maintained at the L-level potential.

As described above, the liquid crystal display device 1 sequentially drives the gate lines 13G(1) to 13G(M) using the gate drivers 11A to 11D, and supplies a data signal to each source line 15S using the source driver 3, thereby displaying an image on the display panel 2.

Figure 7A:
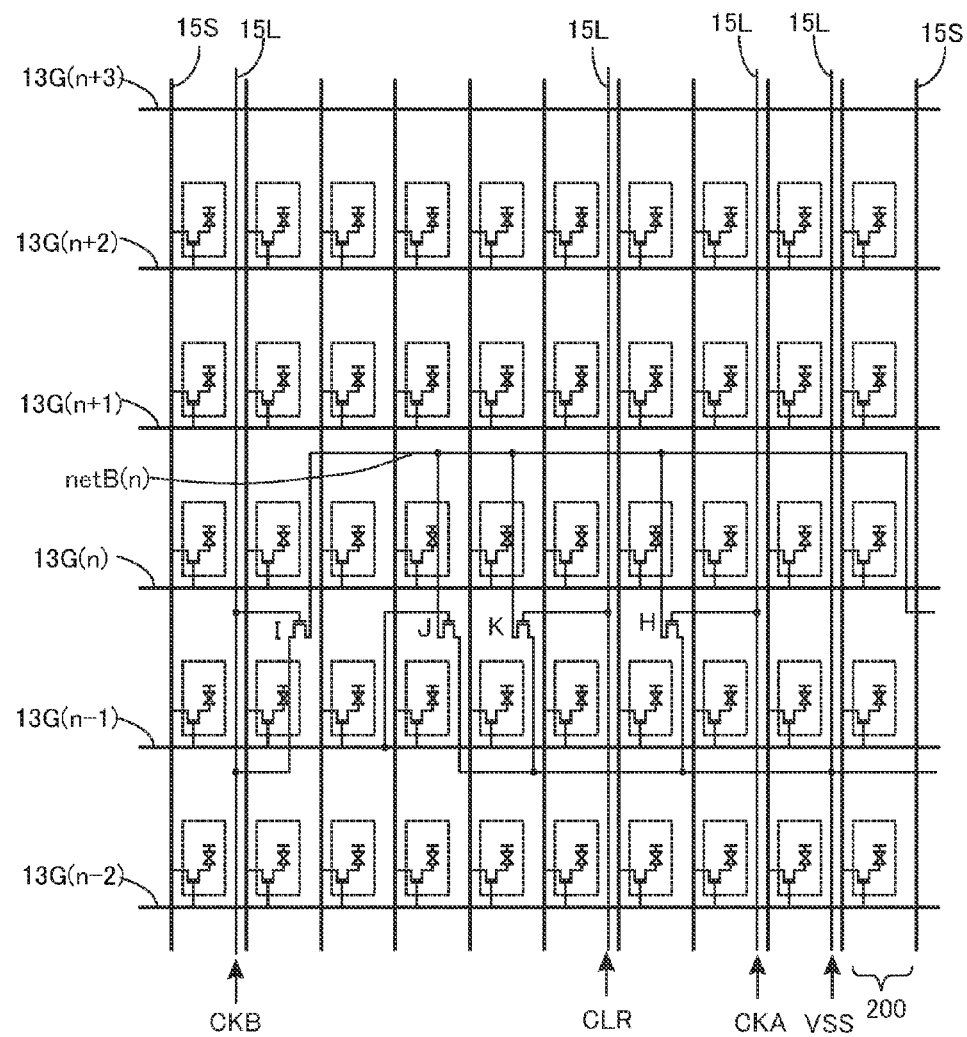
FIG. 7A is a schematic view of an exemplary arrangement of the gate driver illustrated in FIG. 5 in display regions.
Figure 7B:
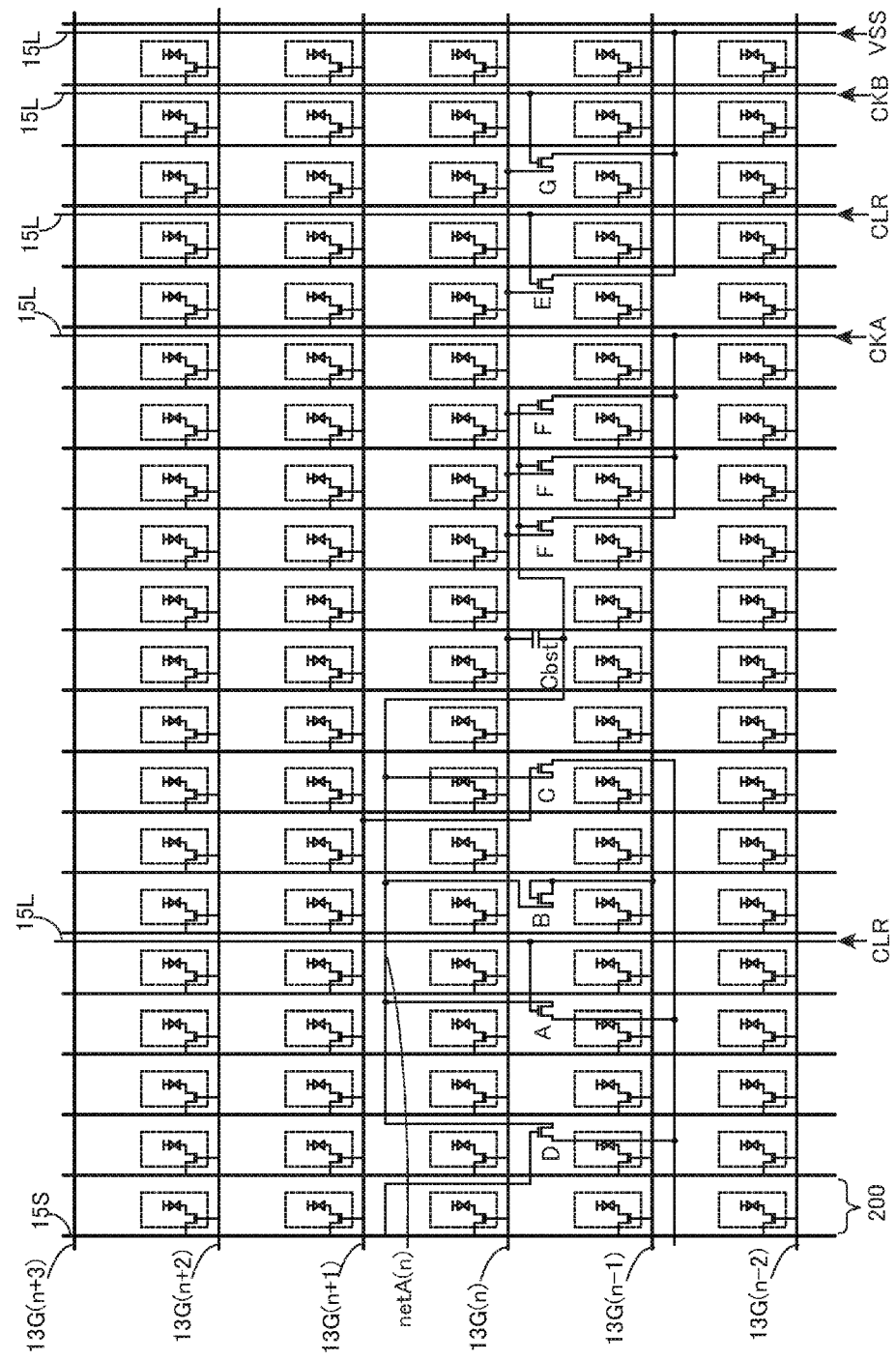
FIG. 7B is a schematic view of an exemplary arrangement of the gate driver illustrated in FIG. 5 in display regions.

Next, an exemplary arrangement of the gate driver 11 of the present embodiment will be described. FIG. 7A and FIG. 7B are schematic views of an exemplary arrangement of the gate driver 11(n) that drives the gate line 13G(n). Although FIG. 7A and FIG. 7B only illustrate the alphabets A to K and omit the representation of "TFT-" for convenience, the A to K correspond to the TFT-A to TFT-K. FIG. 7A and FIG. 7B are continuous at a column 200 illustrated in both FIG. 7A and FIG. 7B.

As illustrated in FIG. 7A and FIG. 7B, each element included in the gate driver 11(n) is located between the gate lines of the gate lines 13G(n−2) to 13G(n+1). The gate drivers 11(n) are connected with the gate line 13G(n−1), 13G(n), and 13G(n+1).

The TFT-A to TFT-K and capacitor Cbst of the gate driver 11(n) are distributed to pixels PIX located between the gate line 13G(n) and the gate line 13G(n−1). For convenience, the TFT-A to TFT-K and capacitor Cbst are adjacent to each other except for in some pixels in this example. The TFT-A to TFT-K and capacitor Cbst, however, may be located in the pixels PIX corresponding to a specific color among the colors R, G, and B of the color filters of the counter substrate 20b.

Furthermore, FIG. 7B illustrates an example in which the TFT-F that functions as an output buffer includes three TFTs connected in parallel. The number of the connected TFTs, however, is not limited to the example. Only two or more TFTs need to be connected. The TFTs other than the TFT-F and the capacitor Cbst may similarly include a plurality of TFTs and a plurality of capacitors, respectively, as necessary.

Although not illustrated in FIG. 7A and FIG. 7B, the gate driver 11(n) is connected via a line 15L to the gate driver 11 that drives the gate line 13G(n+4) and the gate driver 11 that drives the gate line 13G(n−4).

In FIG. 7A, the line 15L that supplies a power supply voltage signal VSS is disposed from the terminal 12g (see FIG. 3) in substantially parallel with the source line 15S in a column other than the columns in which the TFT-J, K, and H are located, and is routed to the pixels in which the TFT-J, TFT-K, and TFT-H are located. Similarly, in FIG. 7B, the lines 15L that supplies a power supply voltage signal VSS is disposed from the terminal 12g (see FIG. 3) in substantially parallel with the source line 15S in a column other than the columns in which the TFT-E and TFT-G are located, and is routed to the pixels in which the TFT-E and TFT-G are located.

In FIG. 7B, the drain terminals of the three TFT-Fs are supplied with a clock signals CKA. The line 15L that supplies the clock signal CKA to the TFT-Fs is disposed from the terminal 12g (see FIG. 3) in substantially parallel with the source line 15S in a column adjacent to the columns in which the TFT-Fs are located, and is routed to the pixels in which the TFT-Fs are located.

As described above, the number of lines can be reduced in comparison with the case in which a line 15L of a control signal is provided for each TFT, by providing a common line 15L for a plurality of TFTs to which the same control signal is supplied.

The arrangement of the pixels in which the three TFT-Fs are located, respectively, in FIG. 7B will specifically be described hereinafter. In the following example, the three TFT-Fs are located in the pixels that correspond to the color B of the color filter (not illustrated).

Figure 8:
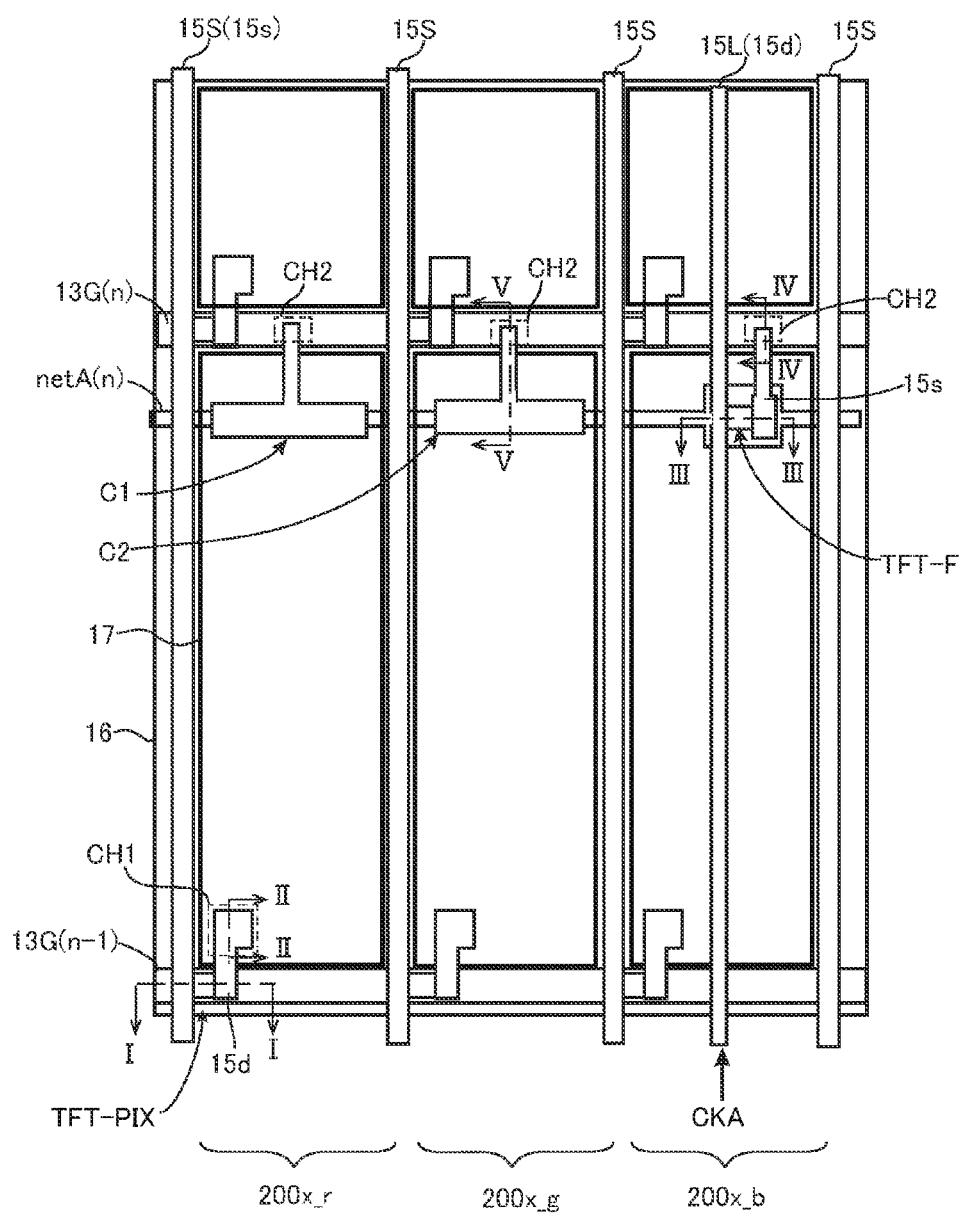
FIG. 8 is a schematic view of an exemplary pixel in which a TFT-F illustrated in FIG. 7B is located.

FIG. 8 is a schematic view of a pixel in which one of the three TFT-Fs in FIG. 7B is located. In FIG. 8, a column 200x_r is provided with a pixel corresponding to the color R of a color filter (not illustrated), a column 200x_g is provided with a pixel corresponding to the color G, and a column 200x_b is provided with a pixel corresponding to the color B.

The pixel of the column 200x_b is provided with the TFT-F. The netA(n) connected with the TFT-F is positioned in each pixel of the column 200x_r and 200x_g. Although FIG. 8 illustrates an exemplary arrangement of one of the TFT-Fs for convenience, the other TFT-Fs are similarly provided in the pixels corresponding the color B, and are connected with each other via the netA(n).

In each pixel of the column 200x_r, 200x_g and 200x_b, a TFT for displaying an image (hereinafter, referred to as a TFT-PIX) is located near the intersection of the gate line 13G and the source line 15S. The TFT-PIX and the pixel electrode 17 are connected via a contact CH1.

The source terminal 15s of the TFT-F is connected via a contact CH2 to the gate line 13G(n). A part of the line 15L that provides the clock signal CKA to the TFT-F functions as the drain terminal 15d of the TFT-F.

Figure 9A:
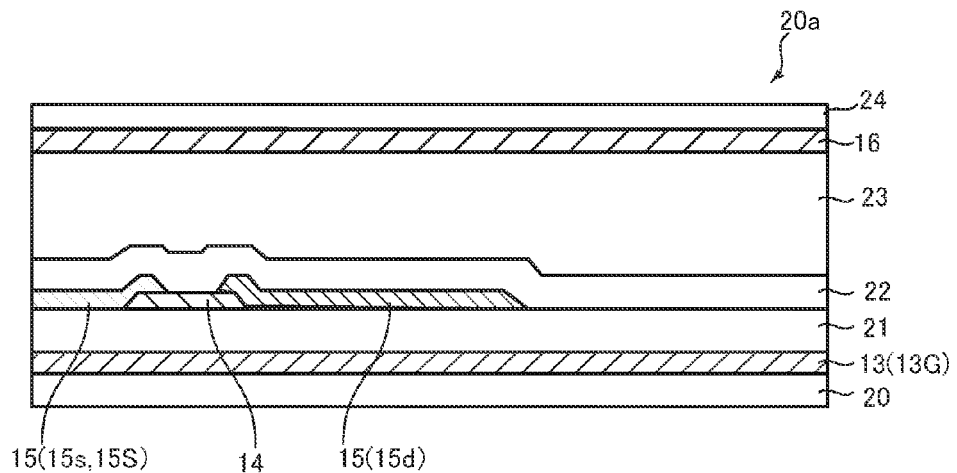
FIG. 9A is a schematic cross-sectional view of the portion including a TFT-PIX illustrated in FIG. 8 taken along line I-I.
Figure 9B:
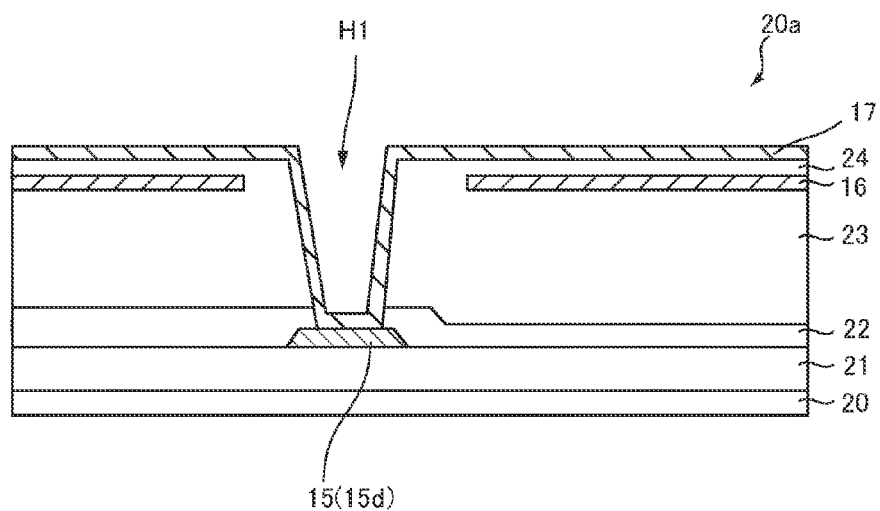
FIG. 9B is a schematic cross-sectional view of a contact CH1 illustrated in FIG. 8 taken along line II-II.
Figure 9C:
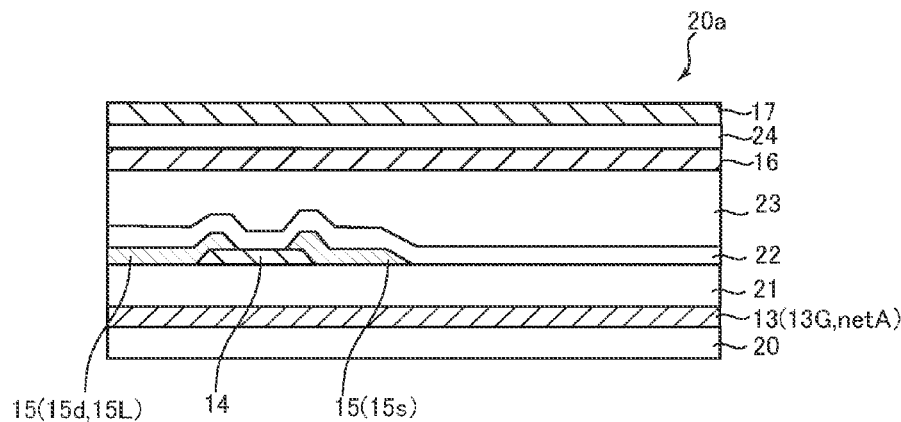
FIG. 9C is a schematic cross-sectional view of the portion including the TFT-F illustrated in FIG. 8 taken along line III-III.
Figure 9D:
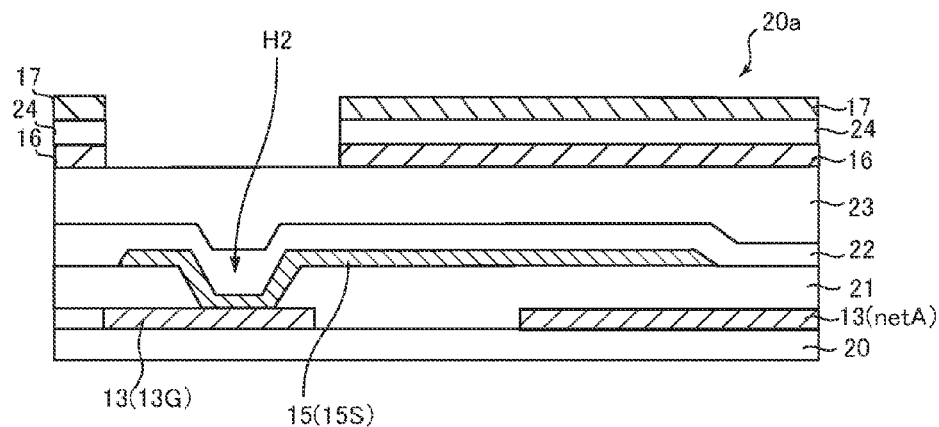
FIG. 9D is a schematic cross-sectional view of a contact CH2 illustrated in FIG. 8 taken along line IV-IV.

The cross-sectional structures of the pixels illustrated in FIG. 8 will be described hereinafter with reference to FIGS. 9A to 9D. FIG. 9A is a cross-sectional view of the portion including the TFT-PIX illustrated in FIG. 8 taken along line I-I. FIG. 9B is a cross-sectional view of the contact CH1 illustrated in FIG. 8 taken along line II-II. FIG. 9C is a cross-sectional view of the portion including the TFT-F illustrated in FIG. 8 taken along line III-III. FIG. 9D is a cross-sectional view of the contact CH2 illustrated in FIG. 8 taken along line IV-IV.

As illustrated in FIGS. 9A, 9C and 9D, the gate line 13G, the gate terminal of the TFT-F and the netA(n) are formed as a gate layer 13 is formed on a substrate 20.

As illustrated in FIG. 9A and FIG. 9C, on top of the gate line layer 13, where a TFT-PIX is to be formed and a TFT-F is to be formed, a semiconductor layer 14 made of an oxide semiconductor is provided together with a gate insulating film 21 being present in between, and a source line layer 15 is formed so as to be separated at the top of the semiconductor layer 14. Thus, as illustrated in FIGS. 9A to 9C, the source line 15S, the source terminals 15s and drain terminals 15d of the TFT-PIX and the TFT-F, and the line 15L are formed.

As illustrated in FIG. 9D, at the contact CH2, a contact hole H2 is formed in the gate insulating film 21 to expose the surface of the gate layer 13. The source layer 15 is provided on the gate insulating film 21 to contact the gate line layer 13 in the contact hole H2. Thus, the source terminal 15s of the TFT-F is connected with the gate line 13G(n) at the contact CH2.

Further, as illustrated in FIGS. 9A to 9D, on top of the source layer 15 are stacked a protection film 22 and protection film 23 to cover the source layer 15. The protection film 22 is formed of an inorganic insulating film such as SiO2, for example. The protection film 23 is formed of an organic insulating film such as a positive photosensitive resin film, for example. Further, as illustrated in FIGS. 9A and 9D, a shield layer 16 is provided on top of the protection film 23. The shield layer 16 is formed of a transparent conductive film such as ITO, for example. Then, on top of the shield layer 16 is provided an interlayer insulating layer 24 formed of an inorganic insulating film such as SiO2, for example. On the top of the interlayer insulating layer 24 are provided pixel electrodes 17 formed of a transparent conductive film such as ITO, as illustrated in FIGS. 9C and 9D.

As illustrated in FIG. 9B, at the contact CH1, a contact hole H1 is provided above the drain terminal 15 of the TFT-PIX to extend through the interlayer insulating layer 24, shield layer 16 and protection films 22 and 23. The pixel electrode 17 is provided on the top of the interlayer insulating layer 24 to contact the drain terminal 15d in the contact hole H1.

The shield layer 16 forms a capacitance between the pixel electrode 17 and shield layer 16, and the capacitance stabilizes the potential of the pixel electrode 17. The shield layer 16 is also formed between the pixel electrode 17, and the TFT-F and the line 15L, thereby reducing the interference between the TFT-F and the line 15L, and the pixel electrode 17. In this example, the pixel electrode 17 is provided also at the position overlying the part in which the TFT and internal lines such as the netA and netB of the gate driver 11 are formed. However, the pixel electrode 17 is not necessarily provided at the position because the part does not allow light to pass through.

As illustrated in FIG. 8, however, the netA(n) connected with the TFT-F is disposed in the pixels of the columns 200x_r and 200x_g in which the TFT-F is not provided. This causes the parasitic capacitance between the netA(n) and the shield layer 16. As described above, the larger the parasitic capacitance of the netA(n) is, the lower the efficiency in increase in potential of the netA(n) is. As a result, at the time the gate line 13G(n) is driven, the potential of the netA(n) cannot be raised to a predetermined potential, and thus a selection voltage cannot be provided via the TFT-F to the gate line 13G(n).

In light of the foregoing, in the present embodiment, electrodes C1 and C2 (reduction parts) made of the same material as the source layer 15 are formed between the shield layer 16 and the netA(n) in the pixels of the columns 200x_r and 200x_g, where the netA(n) is located. This arrangement reduces the parasitic capacitance between the netA(n) and the shield layer 16.

Figure 9E:
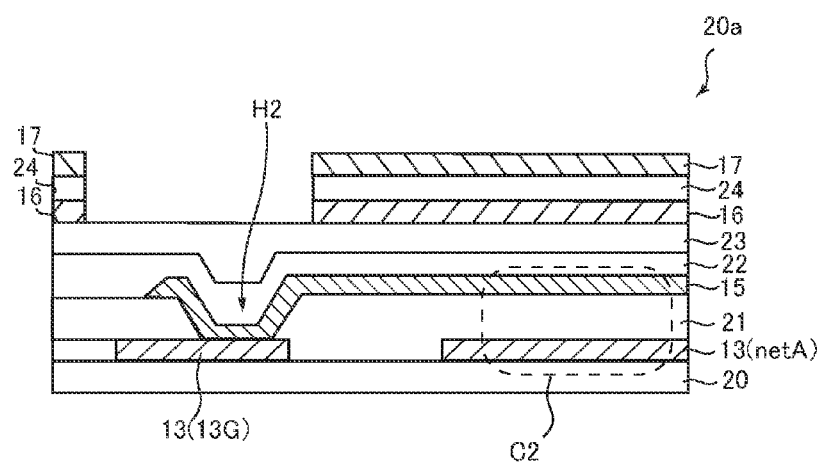
FIG. 9E is a schematic cross-sectional view of the portion including an electrode C2 of FIG. 8 taken along line V-V.

FIG. 9E is a cross-sectional view of the portion including the electrode C2 of FIG. 8 taken along line V-V. As illustrated in FIG. 9E, on the gate layer 13 in which the netA is formed, the source layer 15 is formed together with the gate insulating film 21 being present in between. The source layer 15 is connected with the gate line 13G via the contact hole H2.

The example in which the electrodes are provided between the netA and shield layer 16 provided in the pixels next to the pixel in which the TFT-F is located has been described above. The electrodes, however, can be provided between the shield layer 16 and netA in another pixel in which the netA is disposed.

As described above, in the pixel in which the netA is disposed, the source layer 15 is formed between the netA and the shield layer 16. This arrangement reduces the parasitic capacitance between the netA and the shield layer 16. Furthermore, a capacitor having the netA as the first electrode and the source layer 15 as the second electrode is formed by providing the source layer 15 on the netA with the gate insulating film 21 in-between, and connecting the source layer 15 with the gate layer 13. This arrangement enables the capacitor formed of the electrodes C1 and C2 to function as a part of the capacitor Cbst illustrated in FIG. 5 and FIG. 7B.

Second Embodiment

In the first embodiment, the parasitic capacitance generated between the netA and the shield layer 16 can be suppressed by forming the electrodes C1 and C2 between the netA and shield layer 16 in the pixels in which the netA is disposed. In the present embodiment, another example to reduce the parasitic capacitance between a netA and a shield layer 16 will be described.

Figure 10:
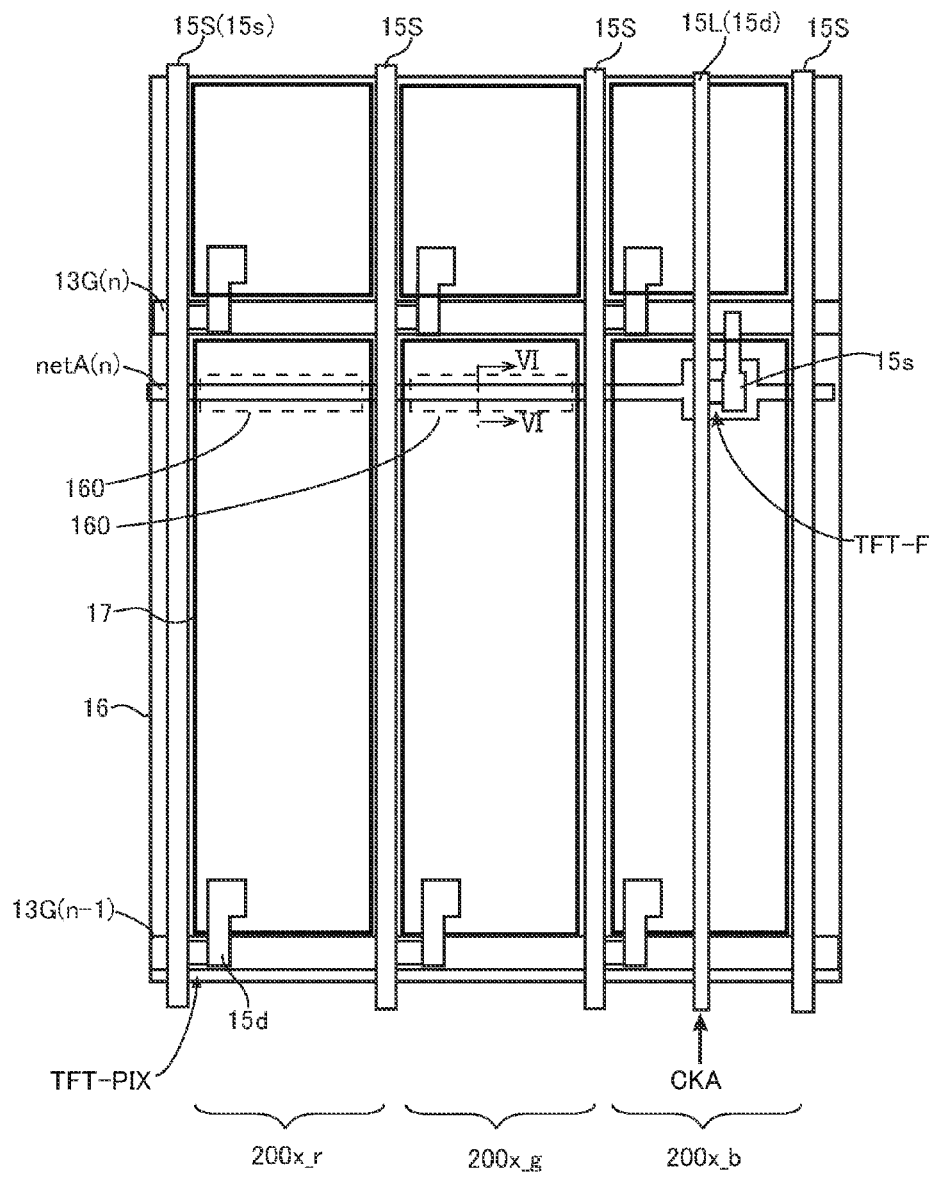
FIG. 10 is a schematic view of an exemplary pixel of a second embodiment in which the TFT-F illustrated in FIG. 7B is located.

FIG. 10 is a schematic view of an exemplary pixel in which one of the three TFT-Fs illustrated in FIG. 7B is located. In FIG. 10, the similar components to the first embodiment are labeled with the same reference numerals as the first embodiment.

In the present embodiment, in the pixels of columns 200x_r and 200x_g in which the netA(n) is disposed, apertures (reduction parts) are provided in the portions of the shield layer 16 that overlie the netA(n) and defined by dashed line frames 160.

Figure 11:
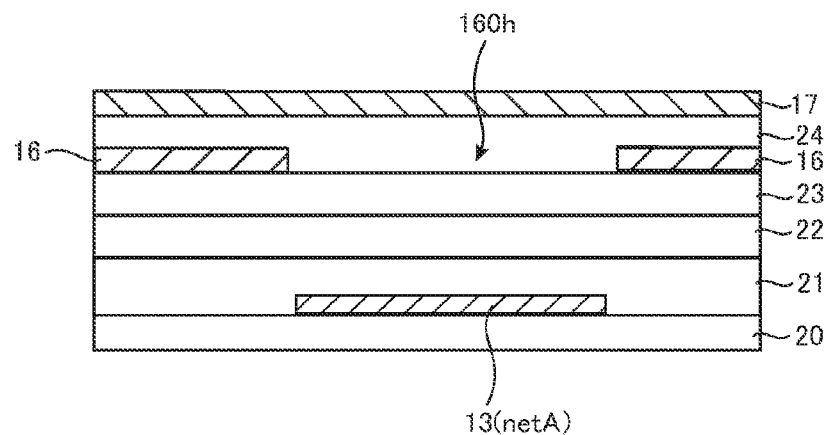
FIG. 11 is a schematic cross-sectional view of the portion defined by a dashed line frame 160 illustrated in FIG. 10 taken along line VI-VI.

FIG. 11 is a cross-sectional view of the portion defined by the dashed line frame 160 illustrated in FIG. 10, taken along line VI-VI. As illustrated in FIG. 11, an aperture 160h is formed at the portion of the shield layer 16 that overlies the netA(n) in the pixel in which the netA(n) is formed. This arrangement prevents the netA(n) from overlying the shield layer 16, and thus reduces the parasitic capacitance between the netA(n) and the shield layer 16.

With reference to FIG. 10, the example in which the apertures 160h are formed in the shield layers 16 in some of the pixels in which the netA(n) is formed has been described above. The aperture 160h, however, can be formed also in the shield layer 16 in another pixel in which the netA(n) is formed.

Figure 12:
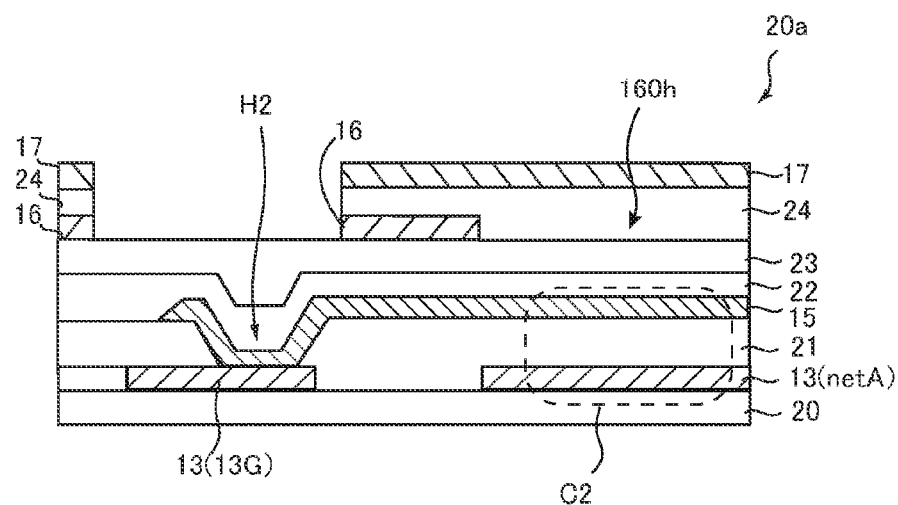
FIG. 12 is a schematic cross-sectional view illustrating a shield layer overlying a netA in FIG. 9E is provided with an aperture.

The configuration of the first embodiment can also be applied to the second embodiment. In other words, as illustrated in FIG. 12, the source layer 15 may be formed between the netA(n) and the shield layer 16 such that the electrodes C1 and C2 are formed before the aperture 160h is provided at the portion of the shield layer 16 that overlies the netA(n). As described in the first embodiment, forming the source layer 15 between the netA(n) and the shield layer 16 at the position at which the netA(n) is formed reduces the parasitic capacitance of the netA(n), but increases the parasitic capacitance of the gate line 13G. In light of the foregoing, providing the aperture 160h at the portion of the shield layer 16 that overlies the netA(n) as illustrated in FIG. 12 can simultaneously reduce the parasitic capacitance of the netA(n) and the parasitic capacitance of the gate line 13G.

Third Embodiment

In the first embodiment and the second embodiment, the examples in which the parasitic capacitance of the netA is reduced have been described. As given in the equation (1), the larger the parasitic capacitance of the TFTs connected with the netA is, the lower the efficiency in increase in potential of the netA is. In light of the foregoing, an example in which the parasitic capacitance of at least one of TFT-A to TFT-D connected with a netA among the TFTs other than a TFT-F is reduced will be described in the present embodiment.

Figure 13:
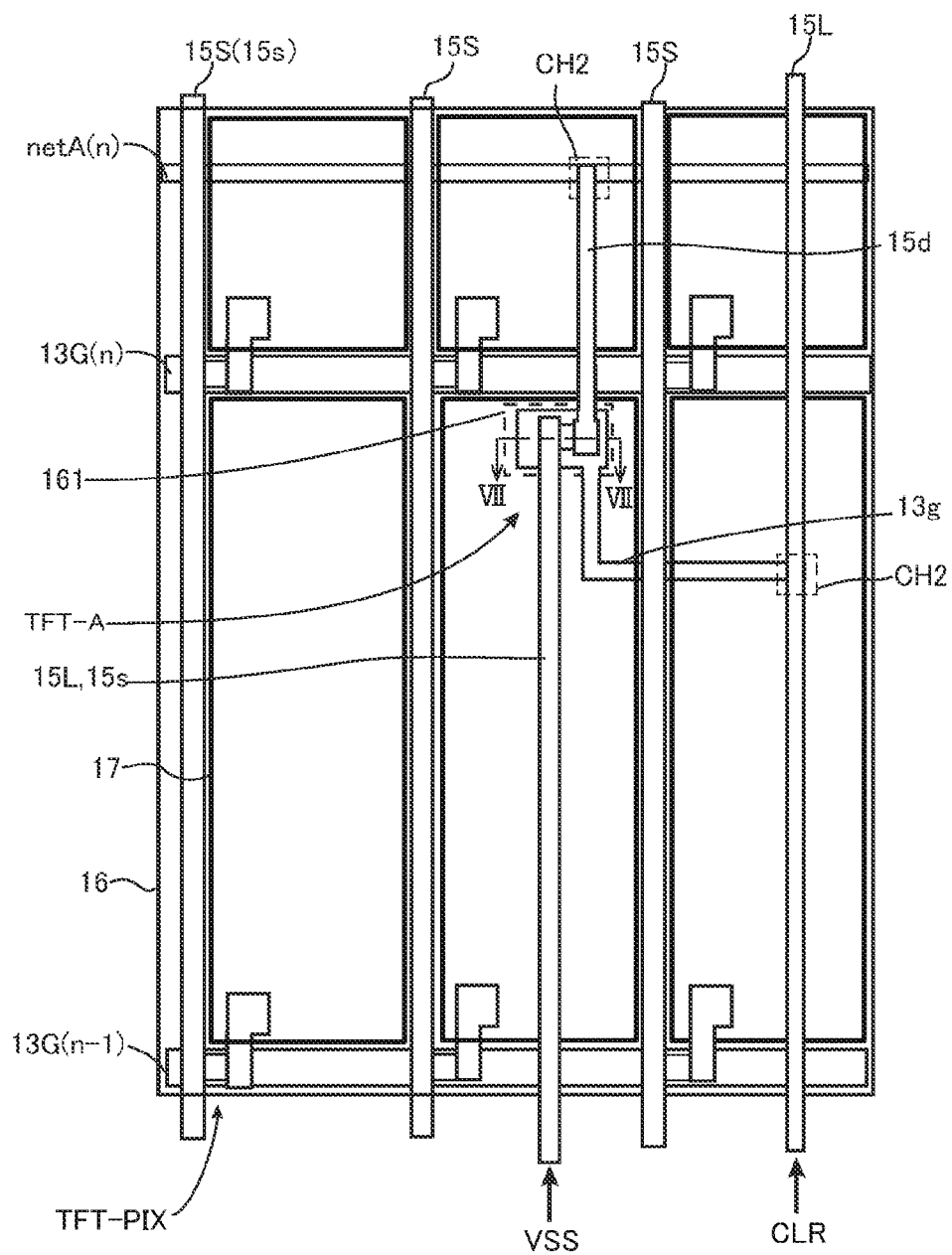
FIG. 13 is a schematic view of an exemplary pixel according to a third embodiment in which a TFT-A illustrated in FIG. 7B is located.

FIG. 13 is a schematic view of an exemplary pixel in which the TFT-A is located as illustrated in FIG. 7B. In FIG. 13, the similar components to the first embodiment are labeled with the same reference numerals as the first embodiment.

As illustrated in FIG. 13, a drain terminal 15d of the TFT-A is connected via a contact CH2 with the netA(n). A gate terminal 13g of the TFT-A is connected via the contact CH2 with a line 15L to which a reset signal CLR is supplied. Furthermore, a part of a line 15L to which a power supply voltage signal VSS is supplied functions as a source terminal 15s of the TFT-A.

Figure 14:
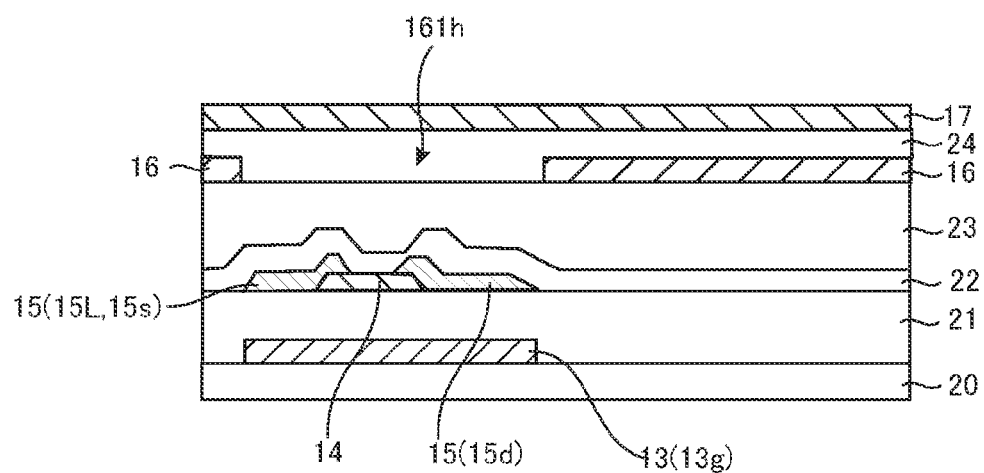
FIG. 14 is a schematic cross-sectional view of the TFT-A illustrated in FIG. 13 taken along line VII-VII.

In the present embodiment, an aperture (reduction part) is provided at the portion of a shield layer 16 that overlies the TFT-A and is defined by a dashed line 161 in the pixel in which the TFT-A is located. FIG. 14 is a cross-sectional view of the TFT-A illustrated in FIG. 13, taken along line VII-VII. As illustrated in FIG. 14, an aperture 161h is formed at the portion of the shield layer 16 that overlies the TFT-A in the pixel in which the TFT-A is formed. The aperture 161h prevents the source terminal 15s and drain terminal 15d of the TFT-A from overlying the shield layer 16, and thus can reduce the parasitic capacitance between the TFT-A and the shield layer 16.

The configuration that reduces the parasitic capacitance with respect to the TFT-A has been described in the present embodiment. An aperture, however, may be provided at the portion of the shield layer 16 that overlies any one of the TFT-B to TFT-D connected with the netA(n) in the pixel in which the TFT is located. This arrangement can reduce the parasitic capacitance of each TFT connected with the netA (n), and thus can increase the efficiency in increase in potential of the netA(n).

An aperture may similarly be provided in the shield layer 16 in the pixel in which the TFT-F is located. The gate terminal of the TFT-F is formed in the same gate layer 13 as the netA(n). On the gate layer 13 is provided the source layer 15 in which the source terminal and drain terminal of the TFT-F are formed. Thus, providing an aperture in the shield layer 16 overlying the TFT-F is less effective in reducing the parasitic capacitance of the netA(n) than providing an aperture in the shield layer 16 overlying any one of the TFT-B to TFT-D, but can reduce the parasitic capacitance of the line 15L through which a control signal is supplied to the TFT-F.

Fourth Embodiment

In the third embodiment, the parasitic capacitance of the TFT connected with the netA(n) is reduced by providing the aperture 161h at the portion of the shield layer 16 that overlies the TFT connected with the netA(n) in the pixel in which the TFT is located. In the present embodiment, a TFT connected with a netA(n) is provided with a drain terminal and a source terminal having a different area with each other. The parasitic capacitance of the TFT connected with the netA(n) is reduced by connecting the drain terminal or the source terminal, whichever has a smaller area, with the netA(n).

Figure 15:
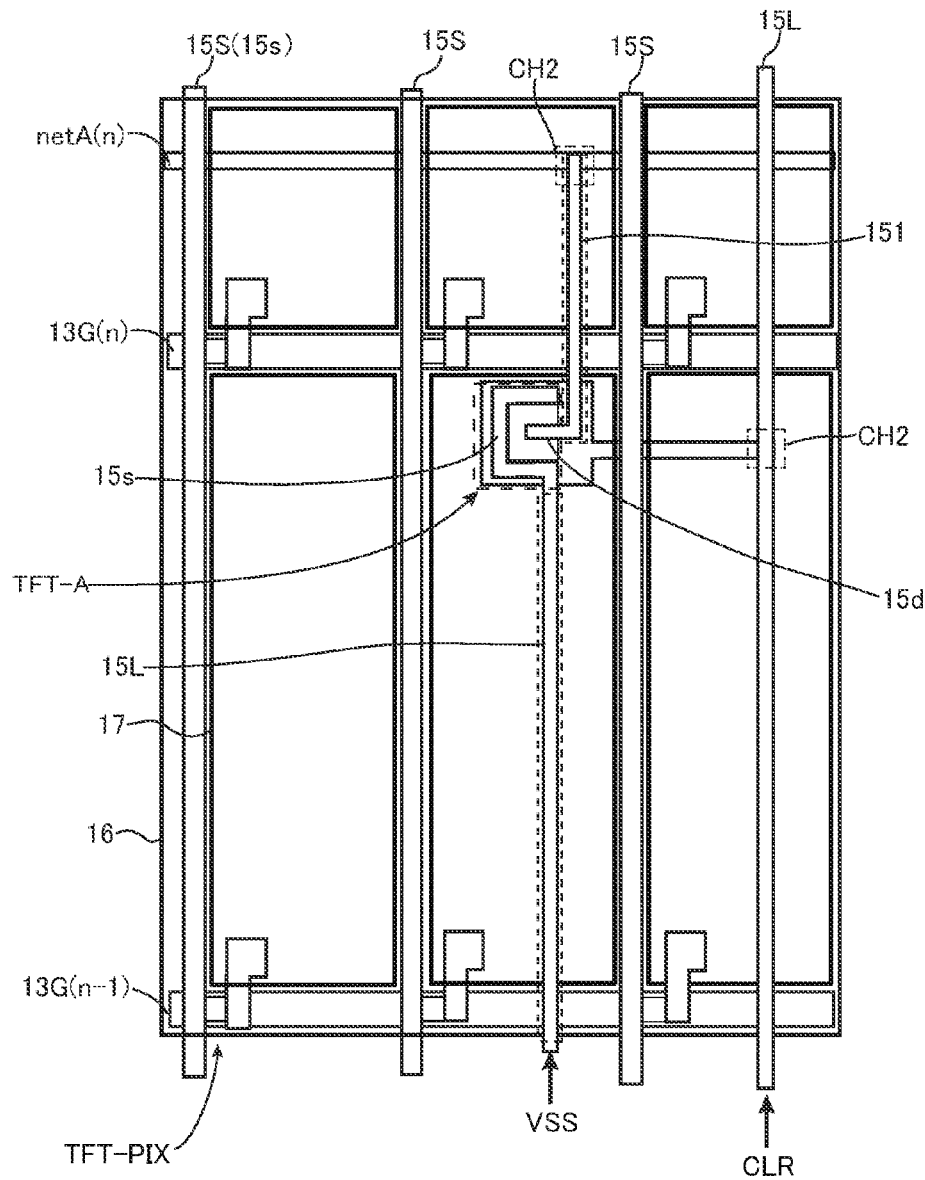
FIG. 15 is a schematic view of an exemplary pixel of a fourth embodiment in which the TFT-A illustrated in FIG. 7B is located.

Hereinafter, the configuration that reduces the parasitic capacitance of the TFT connected with the netA(n) will be described with an exemplary pixel in which the TFT-A is located. FIG. 15 is a schematic view of an exemplary pixel in which the TFT-A is located. In FIG. 15, the similar components to the third embodiment are labeled with the same reference numerals as the third embodiment.

As illustrated in FIG. 15, the TFT-A of the present embodiment includes a source terminal 15s and a drain terminal 15d that are arranged in a comb-teeth shape. In this example, the source terminal 15s has a larger area than the drain terminal 15d.

One end of the source terminal 15s extends in substantially parallel with the source line 15S in the pixel. The extending part of the source terminal 15s functions as a line 15L through which a power supply voltage signal VSS is supplied. One end of the drain terminal 15d extends in substantially parallel to the source line 15S toward the upper pixel. The extending part of the drain terminal functions as a connection part 151 that connects the drain terminal with the netA(n). The connection part 151 is connected via a contact CH2 with the netA(n).

Figure 16A:
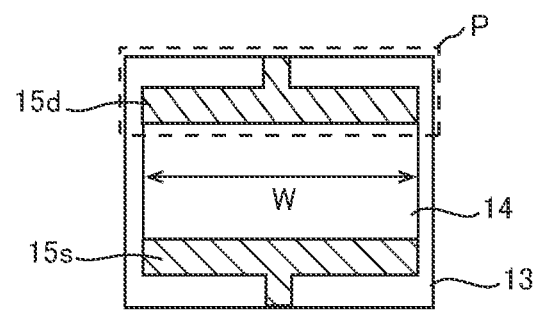
FIG. 16A is an explanatory view of the parasitic capacitance of a TFT in which a source terminal and a drain terminal are arranged in parallel.

As illustrated in FIG. 16A, when the TFT has a channel width W in which the source terminal 15s and the drain terminal 15d that have a rectangular shape and the same area are arranged in parallel and the drain terminal 15d is connected with the netA(n), the part defined by a dashed line frame P is a region contributing to the parasitic capacitance of the TFT. Even if the source terminal 15s is connected with the netA(n), the region contributing to the parasitic capacitance of the TFT has substantially the same area as the region defined by the dashed line frame P.

Figure 16B:
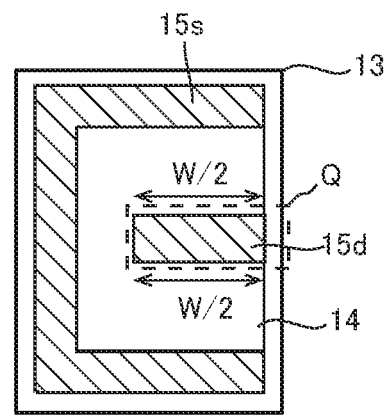
FIG. 16B is an explanatory view of the parasitic capacitance of a TFT in which a source terminal and a drain terminal are arranged in a comb-teeth shape.

On the other hand, as illustrated in FIG. 16B, when the TFT includes the source terminal 15s and the drain terminal 15d arranged in a comb-teeth shape so as to have a channel width of W and one end of the drain terminal 15d is provided with a connection part 151, the region defined by a dashed line frame Q is a region contributing to the parasitic capacitance of the TFT. In other words, connecting the drain terminal 15d having a smaller area with the netA(n) in the TFT illustrated in FIG. 16B reduces the region contributing to the parasitic capacitance of the TFT in comparison with the TFT illustrated in FIG. 16A. As a result, the parasitic capacitance of the TFT is reduced and thus the parasitic capacitance of the netA(n) can be reduced.

The pixel in which the TFT-A is located has been described as an example in which the parasitic capacitance of the netA(n) is reduced. However, the same effect can be achieved by allowing at least one of the TFT-A to TFT-D, and TFT-F connected with the netA(n) to have the configuration illustrated in FIG. 15.

Figure 17:
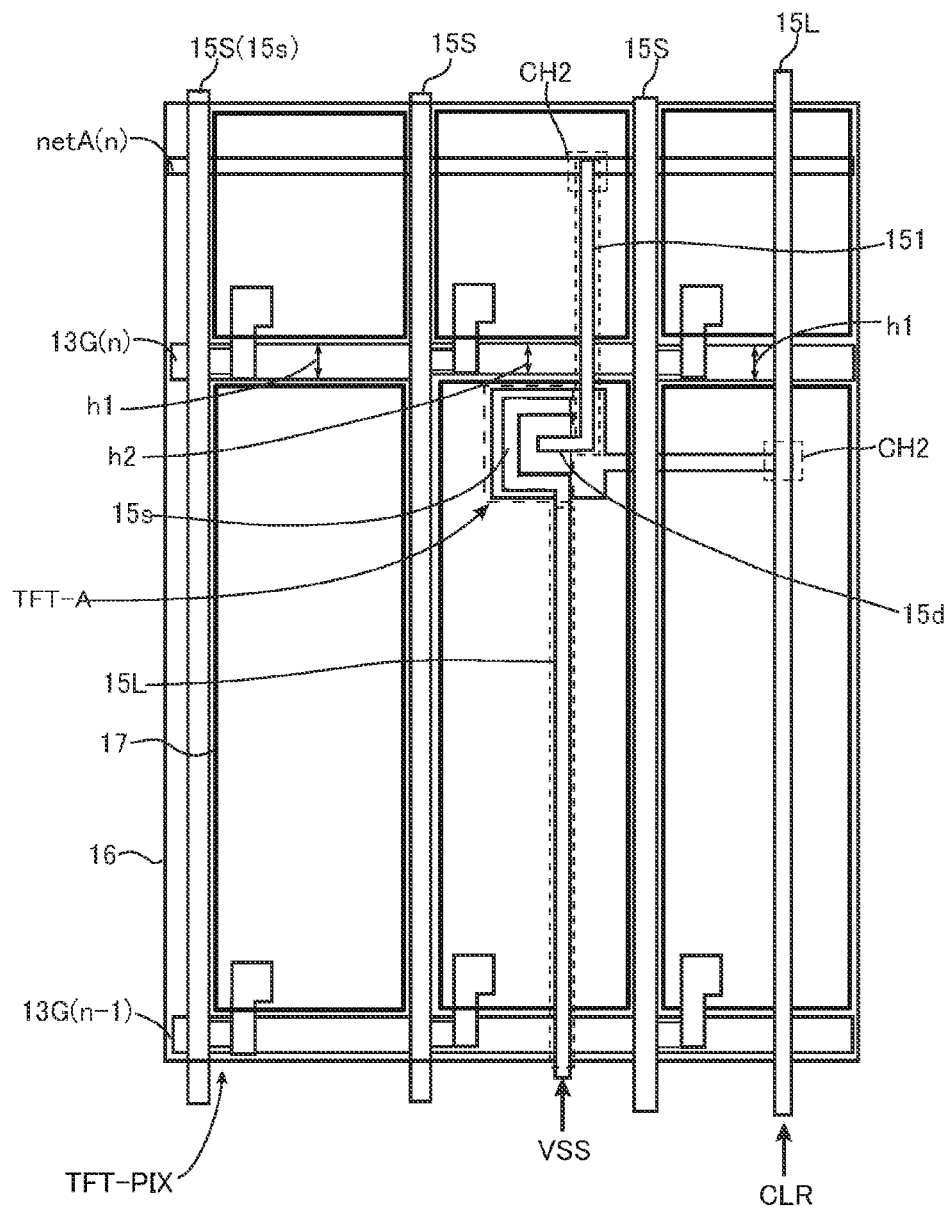
FIG. 17 is an explanatory view of an exemplary arrangement of gate lines according to the fourth embodiment.

As illustrated in FIG. 15 and FIG. 16B, when the TFT includes the source terminal and drain terminal arranged in a comb-teeth shape, the TFT is larger in area than the TFT of FIG. 16A including the source terminal and drain terminal arranged in substantially parallel. This decreases the aperture ratio of the pixel. In light of the foregoing, one gate line 13G forming the pixel in which the TFT-A is located may be shorter than the gate line 13G of the adjacent pixel in width. Specifically, for example, as illustrated in FIG. 17, a width h2 of the gate line 13G(n) provided near the TFT-A may be shorter than a width h1 of the gate line 13G(n) of the adjacent pixels between the gate line 13G(n) and the gate line 13G(n−1). This configuration can lessen the decrease in aperture ratio of the pixel in which the TFT-A is located.

Although embodiments of the present invention have been described, the above embodiments are merely examples that may be used to carry out the present invention. Thus, the present invention is not limited to the above embodiments, and can be carried out with appropriate modifications to or combinations of the above embodiments without departing from the spirit of the present invention. Variations of the present invention will be described below.

Variations (1) The third embodiment can be combined with at least one of the configuration of the reduction parts of the first embodiment and the second embodiment. The combination can reduce simultaneously the parasitic capacitance of the netA and the parasitic capacitance of the TFT connected with the netA. As a result, the efficiency in increase in potential of the netA can be improved.

(2) The first embodiment to the third embodiment can have a configuration in which the source terminal and drain terminal of the TFT connected with the netA are arranged in a comb-teeth shape, similarly to the fourth embodiment, and the drain terminal or the source terminal, whichever has a smaller area is connected with the netA. This configuration can reduce simultaneously the parasitic capacitance of the netA and the parasitic capacitance of the TFT connected with the netA. As a result, the efficiency in increase in potential of the netA can be improved.

The invention claimed is:
1. An active matrix substrate comprising:
a plurality of source lines;
a plurality of gate lines crossing the source lines;
pixel electrodes in a plurality of pixel regions defined by the source lines and the gate lines;
a driving unit provided in a part of the pixel regions, the driving unit including a driving circuit, for each of the gate lines, to switch the gate line to a selection state in accordance with a control signal provided; and
a reduction part arranged to reduce a parasitic capacitance of the driving circuit in the pixel regions,
wherein the driving circuit includes:
a plurality of switching elements; and
an internal line connected with:
a gate terminal of an output switching element, among the switching elements, that supplies a selection voltage for switching one gate line to a selection state,
a first switching element of the switching elements other than the output switching element, and
the one gate line, and
wherein the reduction part is provided in the pixel region in which at least one of the internal line and the first switching element of the driving circuit is located.

2. The active matrix substrate according to claim 1, further comprising a conductive layer provided between the pixel electrodes and the driving circuit in the pixel regions in which the driving unit is provided,
wherein the driving circuit is provided between the pixel electrode and a layer in which the gate line is provided in the active matrix substrate, and
the reduction part is located at a position at which at least one of the internal line and the first switching element of the driving circuit overlies the conductive layer.

3. The active matrix substrate according to claim 2, wherein
the internal line is formed in an identical layer to the one gate line, and
the reduction part includes an electrode between the conductive layer and the internal line in the pixel region in which the internal line of the driving circuit is located, and the electrode is connected via a contact with the one gate line.

4. The active matrix substrate according to claim 2, wherein the reduction part includes an aperture at a position overlying the internal line in the conductive layer in the pixel region in which the internal line of the driving circuit is located.

5. The active matrix substrate according to claim 2, wherein the reduction part includes an aperture at a position overlying the first switching element in the conductive layer in the pixel region in which the first switching element of the driving circuit is located.

6. The active matrix substrate according to claim 1, wherein the first switching element is provided with a drain terminal and a source terminal that are different from each other in area, and
the reduction part includes a connection part that connects one of the drain terminal and the source terminal, which has a smaller area, with the internal line.

7. A display device comprising:
the active matrix substrate according to claim 1;
a counter substrate with color filters; and
a liquid crystal layer held between the active matrix substrate and the counter substrate.

* * * * *